United States Patent [19]

Scanland

[11] 4,280,319
[45] Jul. 28, 1981

[54] DECK CONSTRUCTION FOR ROTARY MOWER

[75] Inventor: Joseph E. Scanland, Savannah, Ga.

[73] Assignee: Roper Corporation, Kankakee, Ill.

[21] Appl. No.: 57,804

[22] Filed: Jul. 16, 1979

Related U.S. Application Data

[63] Continuation-in-part of Ser. No. 918,960, Jun. 26, 1978, Pat. No. 4,172,351.

[51] Int. Cl.³ ................ A01D 67/00; A01D 55/18
[52] U.S. Cl. ................................ 56/255; 56/320.2
[58] Field of Search ............... 56/320.1, 320.2, 255, 56/295, 175, 13.4

[56] References Cited

U.S. PATENT DOCUMENTS

| | | | |
|---|---|---|---|
| 2,983,096 | 5/1961 | Phelps | 56/255 |
| 3,145,519 | 8/1964 | Pearson | 56/255 |
| 3,568,421 | 3/1971 | Smith et al. | 56/255 |
| 4,083,168 | 4/1978 | Oscarsson | 56/255 |

Primary Examiner—Robert A. Hafer
Attorney, Agent, or Firm—C. Frederick Leydig; Richard L. Voit; David J. Richter

[57] ABSTRACT

A deck construction for a rotary mower which includes a shallow cylindrical blade housing with horizontal aprons extending fore and aft therefrom. Integral wheel supporting plates extend vertically along the respective lateral edges of the aprons and at right angles thereto. Each wheel supporting plate has a cantilevered tip portion which extends to the sidewall of the blade housing and which is welded to the sidewall at a region which is spaced substantially upwardly from the lower edge of the housing. The tip portion of each blade supporting plate is of flaring shape defining a generally triangular relief space thereunder and so that the plate forms a downwardly angled brace between housing and apron. The wheel supporting plates and apron are mutually reinforced by a narrow flange extending continuously around the edges thereof between the welded tip portions.

9 Claims, 10 Drawing Figures

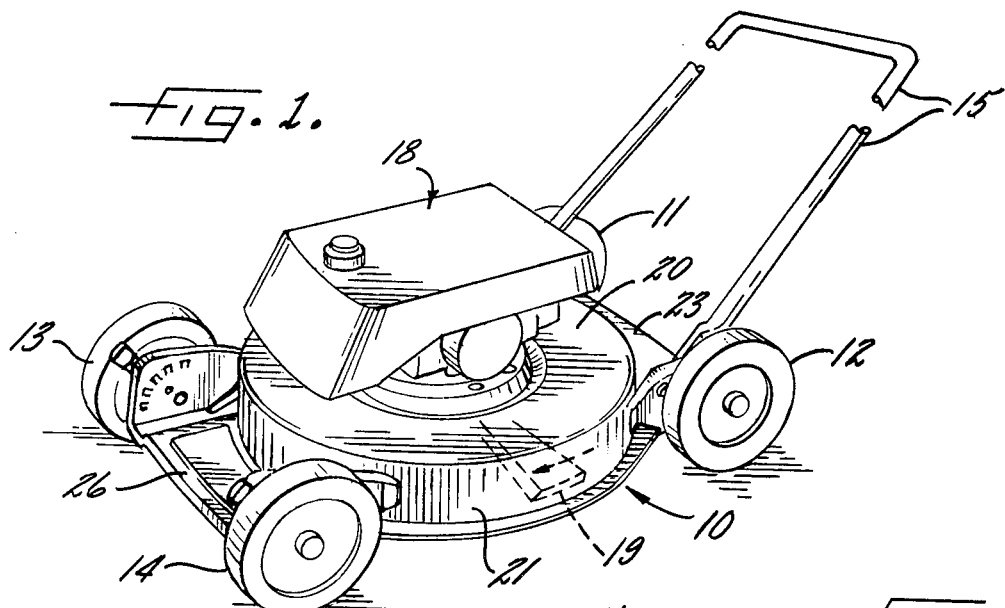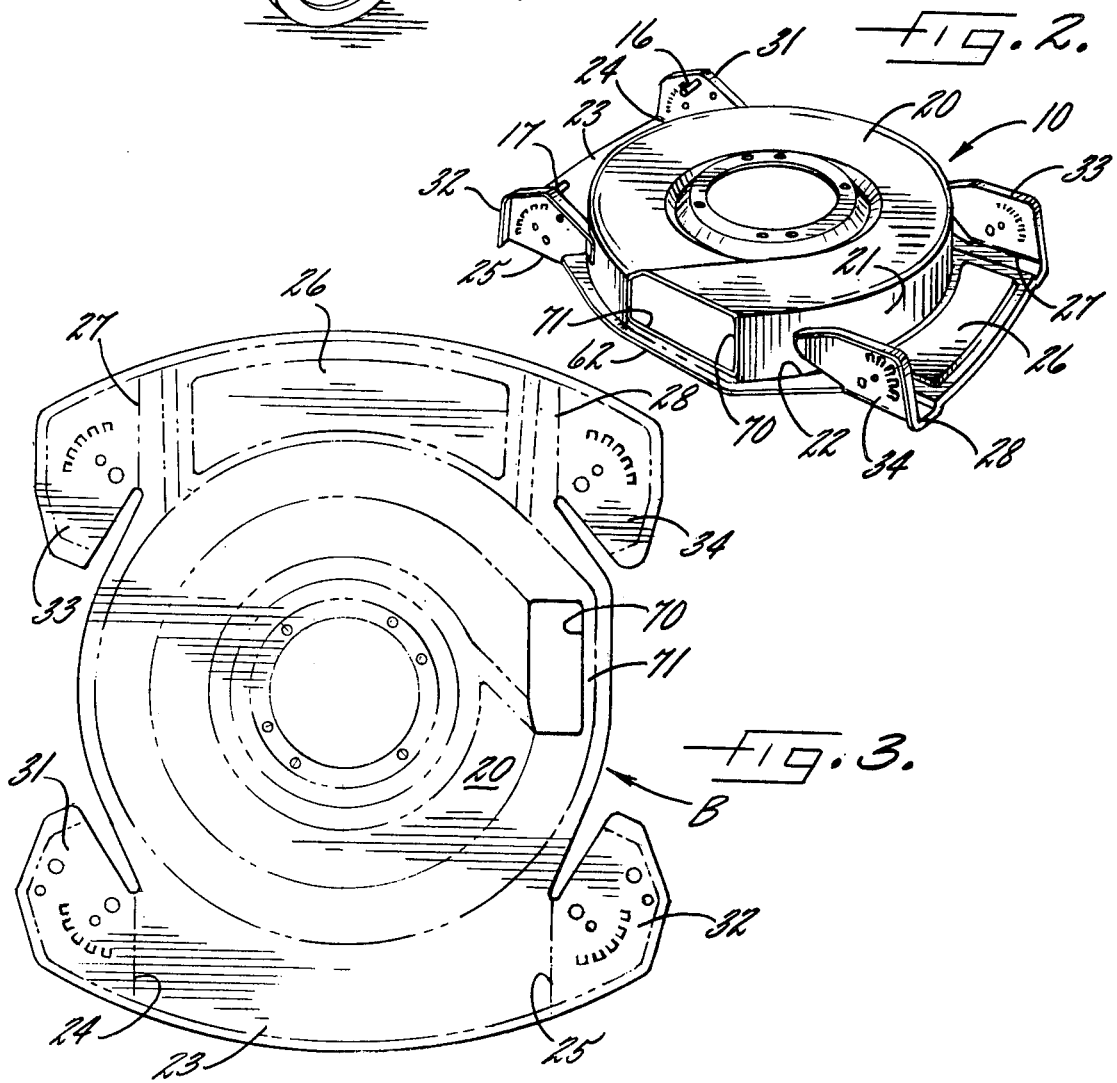

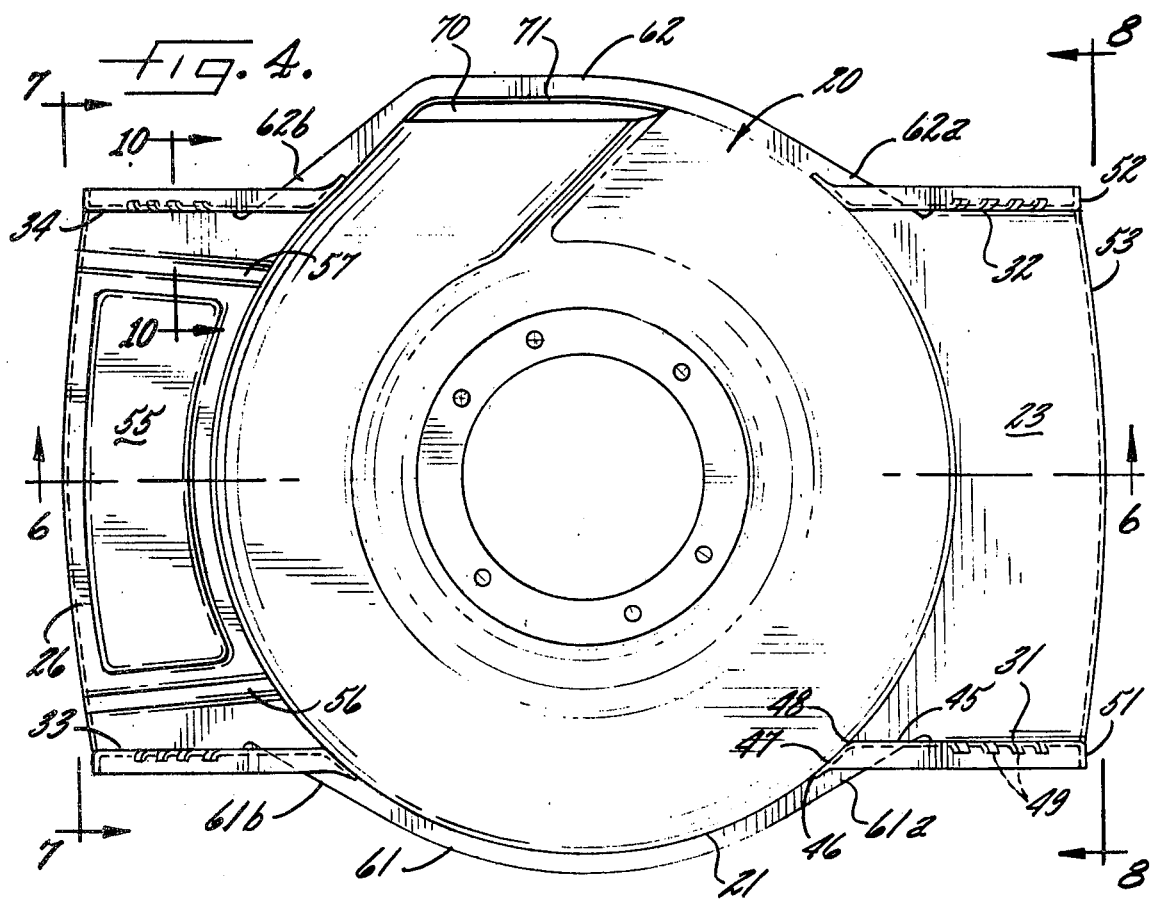
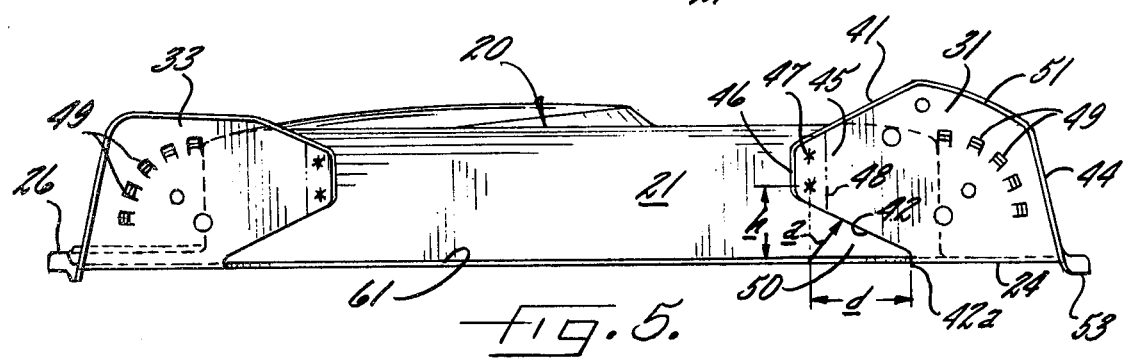
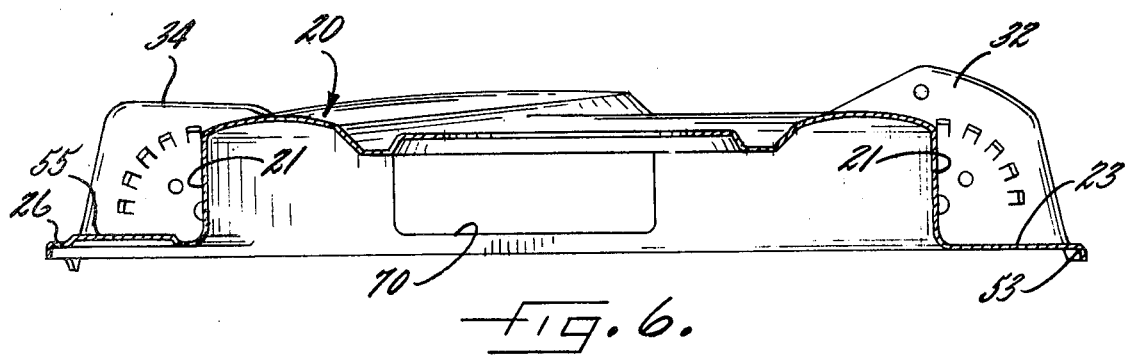

DECK CONSTRUCTION FOR ROTARY MOWER

This is a continuation-in-part of application Ser. No. 918,960 filed June 26, 1978 now U.S. Pat. No. 4,172,351.

It has been proposed in Oscarsson U.S. Pat. No. 4,083,168 to form a mower deck consisting of a blade housing, fore and aft aprons and wheel supporting projections thereon integrally from a single sheet of metal. However, this has produced a design which has inherent weaknesses and which runs risk that upon repeated flexing of the apron, particularly the rear apron, fatigue cracks may develop at the juncture of apron and housing resulting in a hazardous condition in which the rear apron wheel assembly together with the handle may become completely separated from the rest of the machine. Moreover the wheel supporting projections are subject to individual bending back and forth as the wheels forcibly engage surface irregularities.

It is, therefore, an object of the present invention to provide a mower deck of the type in which aprons are integral with the blade housing and wheel supporting plates are integral with the aprons but which is inherently much stronger than conventional designs. Specifically it is an object to provide a mower deck of the above type in which the vertically oriented wheel supporting plates have tip portions which extend to the sidewall of the blade housing and which are welded to the wall at a region which is spaced substantially upwardly from the lower edge of the housing thereby to provide strong angled bracing between the aprons and the blade housing, mutually reinforcing the elements of the structure and making it boxlike to inhibit relative flexing of one element relative to another.

It is aother object of the present invention to provide a mower deck which may be made of thin gauge metal to ensure maximum lightness of the resulting mower but which is nevertheless inherently strong and durable and substantially free from any tendency toward fatigue type failure.

It is a related object to provide a deck structure of the above type in which the tips of the wheel mounting plates rest flatly against the wall of the blade housing permitting economical attachment by spot welding, in which the weldment is stressed in a shearing direction and which exhibits maximum strength and maximum structural integrity.

It is still another object, related to the foregoing, to provide a mower deck of the above type which, in addition to having a stress resisting structural joint between the wheel supporting plates and the housing, employs narrow flanges in a novel fashion to further rigidify the structure. Specifically a flange runs continuously about the periphery of one of the wheel supporting plates, along the presented edge of the associated apron and then about the periphery of the companion wheel supporting plate, in other words from weldment to weldment, so that the wheel supporting plates are mutually reinforced, with still further rigidity being provided by lateral horizontal flanges on the lower edge of the blade housing integrally connected to the respective aprons fore and aft.

It is a general object to provide a mower deck which provides maximum economy of material but which is inherently strong and long lived, a deck which is of maximum simplicity and which may be manufactured economically on a high production basis.

Other objects and advantages of the invention will become apparent upon reading the attached detailed description and upon reference to the drawings in which:

FIG. 1 is a perspective view of a mower utilizing the present deck construction.

FIG. 2 is a perspective view of the deck.

FIG. 3 is a plan view of the blank utilized in making the deck.

FIG. 4 is a plan view of the deck shown in FIG. 2.

FIG. 5 is a side elevational view of the deck of FIG. 2.

FIG. 6 is a vertical section looking along line 6—6 in FIG. 4.

Figure 7:
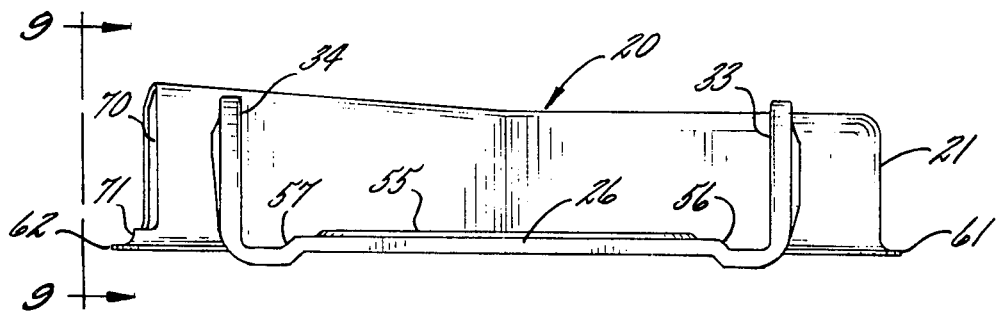
FIG. 7 is a front end elevation looking along line 7—7 in FIG. 4.
Figure 8:
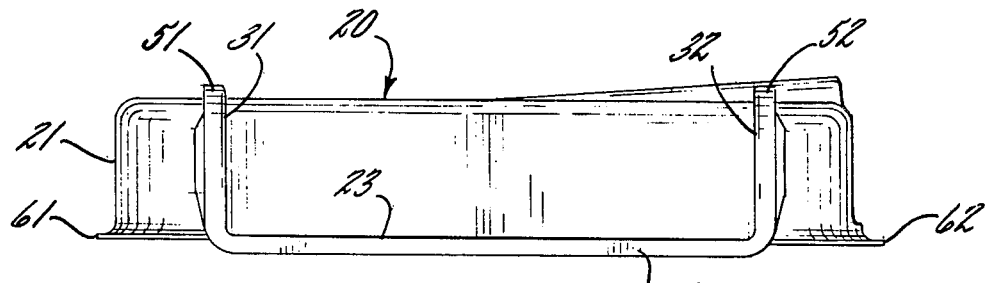
FIG. 8 is a rear end elevation looking along line 8—8 in FIG. 4.
Figure 9:
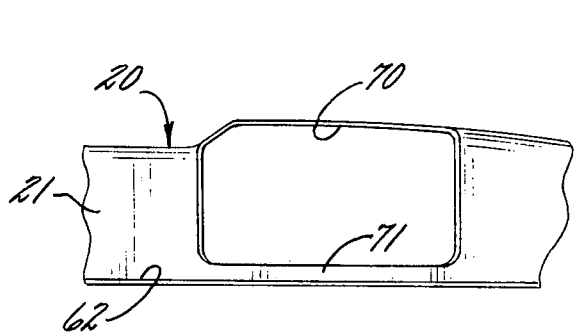
FIG. 9 is a fragmentary elevation showing the discharge opening looking along line 9—9 in FIG. 7.
Figure 10:
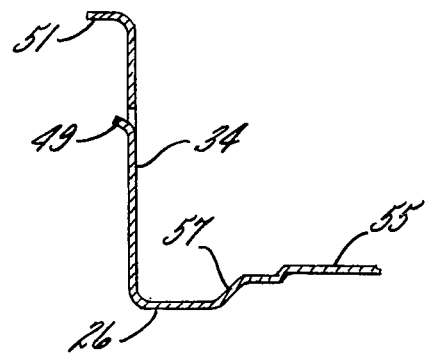
FIG. 10 is a fragmentary section taken along line 10—10 in FIG. 4.

While the invention has been described in connection with a preferred embodiment, it will be understood that I do not intend to be limited by the particular embodiment but intend, on the contrary, to cover the various alternative and equivalent constructions included within the spirit and scope of the appended claims.

Referring now to FIG. 1, there is shown a mower construction in accordance with the present invention having a frame or deck 10, a pair of rear supporting wheels 11, 12 and a pair of front supporting wheels 13, 14. Extending upwardly at the rear of the mower is a handle 15 which has been shown foreshortened, the lower ends of which are pivoted on pins 16, 17 (see FIG. 2). Superimposed upon the deck, and secured to it, is an engine 18 driving a rotary blade 19.

As shown in FIG. 2, the deck 10 has a shallow cylindrical blade housing 20 having a sidewall 21 and lower edge 22. Extending horizontally from the lower edge of the blade housing are a rear apron 23 having lateral edges 24, 25 and a front apron 26 having lateral edges 27, 28. Integral wheel supporting plates 31–34 extend vertically along the respective lateral edges of the aprons and at right angles thereto.

In accordance with the present invention, each of the wheel supporting plates 31–34 has a cantilevered tip portion which exends to the sidewall of the blade housing and which is welded to the sidewall at a region which is spaced substantially upwardly from the lower edge of the housing. Thus, taking the wheel supporting plate 31 as representative, and as shown in FIGS. 4 and 5, the plate has an upper edge 41 and lower edge 42 having an adjacent bent edge 24 as well as a remote edge 44. The upper and lower edges 41, 42 define between them a tip portion 45 terminating in a remote end or tip 46, the tip portion being sufficiently long as to overlap the sidewall 21 of the housing. The plate 31 is planar but, as shown in FIG. 4, the tip portion is bent out of the plane, at 48, for flat seating against the sidewall 21, thereby to provide the intimate area contact necessary for spot welding 47 and so that the weld is largely shear-loaded, the bend 48 being angular to achieve a condition of tangency.

Since the present invention is directed toward a mower deck construction, as an article of manufacture, the details of the wheel mounting are not pertinent and need not be set forth. It will suffice to say that a wheel, for example as indicated at 11, is mounted upon a stub axle on a lever which, in turn, is pivoted to the supporting plate. To hold the lever in one of a series of vertically adjusted positions, the lever cooperates with adjacent ones of a series of individually struck-out tabs 49 arranged in an arcuate locus. For a still further example of an adjustable wheel mounting on a vertical plate, reference is made to my co-pending application, Ser. No. 918,960 which was filed June 26, 1978.

In carrying out the present invention the upper and lower edges 41, 42 of the tip portion of the plate diverge, or flare, from the region of welding so that the plate 31 forms a downwardly angled brace which performs a dual function: In the first place the plate prevents vertical flexure of the apron to which it is secured. The plates thus, taken together, serve to integrate the housing with the aprons to form a rigid box-like structure which is inherently strong and which resists fatigue-type failure. Anchoring the wheel supporting plates 31-34 by welding, as shown, also inhibits lateral flexing of the plates about the region of bending, that is, the region of connection to the apron, in response to variations in wheel loading as the mower is pushed over rough ground or strikes an obstruction.

It is, moreover, one of the features of the present construction that, in addition to the upward spacing of the weld 47, the point of juncture, indicated at 42a, of each wheel supporting plate with its associated apron is substantially spaced from the sidewall of the housing so that a triangular relief space is formed under the tip portion of the plate. Thus where the weld 47 is located at a minimum height h above the lower edge of the housing and the point of juncture 42a is located at a horizontal distance d from the wall, a generally triangular relief space 50 is formed which serves as a distinguishing feature of the present invention. Absent the welded construction and absent the relief space, the reaction force of the mower wheels, acting upon the supporting plate, would produce a bending moment which is concentrated at the bend line where the apron joins the housing, resulting in eventual fatigue failure along such line. Because of the large mechanical advantage of the wheel moment acting upon the concentrated region of juncture, concentrated forces, reaching a high level, can be developed, for example, where the mower at full operating speed strikes a rock or similar obstruction. However, in the present construction where height h and distance d (FIG. 5) are substantial, the minimum moment arm a of the wheel supporting plate, considered as an angular brace, is quite large. Since the force developed in the brace, and effective at the ends (42a, 47) thereof, is equal to the torque divided by the moment arm, where the minimum moment arm is large, the resultant force is small, even for relatively large peak values of applied torque. In other words, even where hitting a sudden obstruction results in a large peak value of torque being developed in the apron, and hence in the wheel supporting plate, the resulting reaction force applied at the weld 47 and at the critical point of juncture 42a is relatively small, the result being long lasting welds and freedom from cracks originating at the point of juncture. As a further deterrent to the origination of cracks, the point of juncture is radiused as shown in plan view in FIGS. 3 and 4.

It is one of the further features of the present invention that adjacent ones of the wheel supporting plates and the apron therebetween are surrounded by a narrow flange bent out of the respective planes of the plates and apron to mutually rigidify the three of them. Thus the wheel supporting plate 31 is formed with an integral outwardly bent, relatively narrow flange 51, while the companion plate 32 is surrounded by a similar outwardly bent flange 52. The apron 23, between the two, is provided with a narrow downwardly bent flange 53. Preferably, and in accordance with one of the aspects of the invention, the flanges 51, 53, 52 form a single and continuous flange reinforcement between the regions of welding to the sidewall of the blade housing. As may be noted in FIG. 4, the ends of the flanges 51, 52 actually extend beyond, and overlie, the regions 47 of the weld. The continuous flange forms a rigid, flexure-resisting connection between cooperating ones of the wheel supporting plates so that when a single wheel of the mower strikes an obstruction, the resulting reaction torque is not concentrated at only one of the supporting plates but tends to be shared by both of them, one being supported by the other.

For the purpose of providing additional longitudinal and lateral rigidity in the apron to increase the above-mentioned sharing of the load, and to maximize rigidity even where relatively light gauge metal is used, either one or both of the aprons may be provided with an embossed panel 55 which is more or less centered in, and conforms to, the shape of the apron (see especially FIG. 4) and, further, the apron may be stepped on each side of the embossment as indicated at 56, 57. Similarly, if desired, other embossments may be formed in the aprons and wheel supporting plates to provide additional rigidity to the aprons and plates.

The housing 20, being of shallow cylindrical shape, has a high inherent degree of rigidity. Rigidity of the housing is further increased by forming, on the lateral lower edges of the housing, narrow horizontal flanges which are integrally joined, at their ends, to the aprons. Such horizontal flanges, indicated at 61, 62 have ends indicated by subscripts a and b, the "a" ends merging smoothly with the apron 23 while the "b" ends merge with the apron 26, the flanges becoming progressively wider in the region of merging.

In accordance with one of the aspects of the present invention, a discharge opening for the clippings is formed in the vertical sidewall of the housing, with the opening being bounded along its lower edge by a tie rod, the ends of which are integrally joined to the blade housing at the lower edge of the latter. In the present construction, the discharge opening, indicated at 70, is formed by striking out a rectangular portion of the blank (FIG. 3), the opening 70 being bounded, along its lower edge, by a tie rod 71 which is in the shape of a structural "angle" formed in part by the horizontal flange 62 previously mentioned.

While only the wheel supporting plate 31 has been described in detail, it will be understood that the wheel supporting plates 32, 33 and 34, completing the set, are similarly constructed.

It will be seen that the above mower deck construction has not only a high degree of strength and box-like rigidity, as well as an attractive functional appearance, but it may be easily and quickly formed on a high production basis from a single blank of metal. The blank, indicated at B in FIG. 3, may be profiled as shown, and the discharge opening created therein, as well as the central opening, as a single operation. The functional holes in the wheel supporting plates may be made as part of the original blank forming operation or as part of a successive punching operation. Following formation of the blank, the housing portion 20 is formed by drawing between a pair of upper and lower dies. The apron embossment, the central embossment which supports the engine, and the reinforcing flanges on the wheel supporting plates and aprons, may all be either preformed or formed at the time of the main drawing operation. Finally, the wheel supporting plates 31-34 are bent at 90 degrees along their lower bend lines into upstanding position in which the tip portions of the plates lie flatly against the housing sidewall in position for spot welding.

While welding is a preferred mode of attachment, the important thing is that there be integral metal-to-metal contact between the tip portion and the sidewall; thus the tip portion may be area-brazed in place without departing from the invention. Where spot welding is used, the spots should preferably be plural, distributed, as shown, over a substantial area of the tip portion to provide a high degree of shear and fatigue resistance.

After welding, the deck is de-burred, suitably painted, as for example by a dipping process, and the other parts are added including the handle, the wheels and their mounts, and the engine including its blade and necessary controls.

Also while the wheel supporting plate flares smoothly from the relatively narrow tip to form a smooth triangular clearance opening, the invention is not limited to this and the flare, if desired, may be stepped while still employing the invention.

The structure, in use, has a high degree of safety since the aprons serve to ricochet downwardly any upwardly angled missiles struck by the blade. While the construction has good safety characteristics in the lateral direction, safety in such direction may be further improved by providing a downwardly angled chute or guard (not shown) at the discharge opening 70 and by providing an auxiliary vertical guard (also not shown) adjacent the lateral flange 61 (FIG. 4) for example as disclosed in the co-pending application mentioned above.

What is claimed is:

1. A rotary mower deck comprising in combination a shallow cylindrical blade housing, the housing having a vertical sidewall with a lower edge, horizontal front and rear aprons extending fore and aft from the lower edge of the housing to define respective leading and trailing edges extending transversely of the deck, the aprons having lateral edges, upwardly bent wheel supporting plates on the respective lateral edges of the aprons and extending vertically at right angles thereto, the blade housing, aprons and wheel supporting plates being all integrally formed of the same sheet of metal, the wheel supporting plates associated with at least the rear apron each having a cantilevered tip portion having a lower edge which is free of the adjacent apron, the tip portion being sufficiently long as to overlap the sidewall of the housing and engaging such side wall at a region which is spaced substantially upwardly from the lower edge of the housing, the tip portion of each associated wheel supporting plate being secured at its remote end in integral metal-to-metal contact to the sidewall of the housing whereby such wheel supporting plate in addition to its wheel-supporting function forms a downwardly angled integral brace between the sidewall and the adjacent apron.

2. The combination as claimed in claim 1 in which each associated wheel supporting plate is generally planar and in which the remote end of the tip portion thereof is bent angularly out of the plane for flat tangential seating on the sidewall of the blade housing so that the integral metal-to-metal engagement is distributed over a substantial area at the end of the tip portion.

3. The combination as claimed in claim 1 in which the remote end of the tip portion of each associated wheel supporting plate is of narrow vertical dimension as compared to the vertical dimension of the plate, the plate being of flaring shape horizontally from the region of attachment to the housing, and the point of juncture of each such wheel supporting plate with its associated apron being substantially spaced from the sidewall of the housing so that a generally triangular relief space is formed under the tip portion of the plate.

4. The combination as claimed in claim 1 in which the edges of adjacent ones of the wheel supporting plates and the apron therebetween are surrounded by a continuous narrow flange bent out of the respective planes thereof.

5. The combination as claimed in claim 4 in which the flanges on the wheel supporting plates are outwardly bent while the flanges on the aprons are downwardly bent, the flanges extending continuously (a) from the secured tip portion of one wheel supporting around the same to the edge of the associated apron, (b) along the edge of the associated apron to the companion wheel supporting plate, and (c) around the companion wheel supporting plate to the secured tip portion thereof.

6. The combination as claimed in claim 4 in which at least one of the aprons has an embossed panel centrally formed therein to provide substantial rigidity both longitudinally and laterally.

7. The combination as claimed in claim 1 in which the housing has narrow horizontal flanges extending around its lateral lower edges, the flanges being integrally merged at their fore and aft ends to the respective aprons, the flanges becoming progressively wider as they approach and merge into the aprons.

8. The combination as claimed in claim 1 in which the blade housing has a discharge opening formed in the vertical sidewall thereof, the opening being bounded along its lower edge by a tie rod, the ends of the tie rod being integrally joined to the housing at the lower edge of the latter, the housing having an integral outwardly extending flange along its outer edge causing the tie rod to be of rigid L-shaped cross section.

9. In a rotary mower deck the combination comprising a shallow cylindrical blade housing having a vertical sidewall with a lower edge, horizontal aprons extending fore and aft from the lower edge of the housing, narrow flanges extending laterally from the lower edge of the housing, the narrow flanges and the aprons being joined integrally, the aprons having lateral edges, upwardly bent wheel supporting plates on the respective lateral edges of the aprons and extending vertically at right angles thereto, narrow flanges bounding the wheel supporting plates and the fore and aft edges of the respective aprons, the blade housing, aprons, wheel supporting plates and the narrow flanges thereon being all integrally formed of the same sheet of metal, each wheel supporting plate having a cantilevered tip portion which extends overlappingly to the sidewall of housing and which engages such sidewall at a region which is spaced substantially upwardly from the lower edge of the housing, the end of the tip portion of each plate being bent angularly out of the plane of the plate for flat tangential seating on the side wall of the blade housing and secured integrally to the sidewall of the housing by welding, the end of the tip portion of each wheel supporting plate being of narrow vertical dimension as compared to the vertical dimension of the plate and flaring horizontally from the region of attachment to the housing so that the plate forms a downwardly angled brace and defines a generally triangular relief space under the tip portion of the plate.

* * * * *

UNITED STATES PATENT AND TRADEMARK OFFICE
CERTIFICATE OF CORRECTION

PATENT NO. : 4,280,319
DATED : July 28, 1981
INVENTOR(S) : Joseph E. Scanland

It is certified that error appears in the above—identified patent and that said Letters Patent is hereby corrected as shown below:

Column 6, line 19, after "supporting" insert --plate--.

Signed and Sealed this

Twenty-second Day of September 1981

[SEAL]

Attest:

GERALD J. MOSSINGHOFF

*Attesting Officer*     *Commissioner of Patents and Trademarks*